United States Patent Office 3,539,368
Patented Nov. 10, 1970

3,539,368
METHOD OF INCORPORATING FILLERS IN CATIONIC BITUMINOUS EMULSIONS AND PRODUCTS PRODUCED THEREBY
Robert D. Timmons, Tinley Park, Leslie M. Harkness, Chicago, and Milton M. Waldman, Northbrook, Ill., assignors, by mesne assignments, to Armour Industrial Chemical Company, a corporation of Delaware
No Drawing. Filed Dec. 13, 1967, Ser. No. 690,090
Int. Cl. C08h 13/00; C08k 1/62; C09d 3/24
U.S. Cl. 106—277                                      8 Claims

ABSTRACT OF THE DISCLOSURE

Pretreatment of filler materials with amine oxides followed by incorporating into cationic bituminous emulsions resulting in storage stable dispersions of fillers in aqueous cationic bituminous emulsions. These compounds are useful as crack fillers, roofing compositions, sound deadeners and protective and insulating coatings.

BACKGROUND OF THE INVENTION

The prior art methods for preparing filled asphaltic sound deadening materials for spray applications have been to either use solvent cutback systems or anionic or clay emulsion systems. Both of these methods have undesirable characteristics. The solvent cutback system is hazardous from the standpoint of inflammability of the fluids used as a solvent and sometimes presents danger to personnel in the area as to toxicity of vapors given off by the solvent fluids. The anionic or clay emulsion system is disadvantageous in that it requires the use of large filler particles. Both the sound deadening and flexibility properties of the presently used systems are not as good as would be desired and both methods have problems of inherent corrosivity.

Pretreatment of filler materials has previously been utilized but such methods have resulted in poor storage stability and high viscosity rendering the filler emulsions unsatisfactory for spray application.

SUMMARY OF THE INVENTION

We have discovered many of the disadvantages inherent in the prior art methods of incorporating fillers in bituminous systems are avoided by the pretreatment of the filler material with certain tertiary amine oxides. We have found that by utilizing this new process we can use finer particle size of filler and can incorporate more filler into the emulsion that heretofore possible. Further, the cationic bituminous emulsion containing in the order of 60 percent finely-divided filler in accordance with our invention is stable for periods of many weeks and is of a viscosity which is very suitable for spray application.

Our invention relates to a method of incorporating fillers in cationic bituminous emulsions. More particularly, the invention is concerned with a method for preparation of storage stable dispersions of negatively-charged fillers in aqueous cationic bituminous emulsions. The invention also relates to products produced by the method, which have utility as floor tile adhesive, sound deadeners, protective coatings and insulating coatings. The products of this invention may have other applications where either the waterproofing of cationic bituminous emulsions or the properties imparted by filler material or sound proofing and insulating properties are designed.

While cationic bituminous emulsions are relatively new, they have experienced considerable acceptance in road building applications. The cationic bituminous emulsions themselves are relatively stable, but tend to deposit rather rapidly when mixed with sand, soil, or other natural finely-divided materials. In such instances, the asphalt of the cationic emulsions is deposited from the emulsion due to the attraction of charges between the asphalt droplets and the finely-divided material.

The external surfaces of most filler materials generally have a net surface charge which is negative in polarity. The surface charge is independent of the acidic or basic character of the material. For example, silica dust is an acidic mineral while limestone is a basic material yet both limestone powder and silica dust are filler materials which present negatively charged surfaces. Further, the surface charge effect is greatly magnified by the finely-divided filler materials in view of the great increase in surface area as particle size decreases. Most fillers which are most readily used in such systems have negatively charged surfaces. Thus, it is clearly seen that fillers having negatively charged surfaces incorporated in cationic bituminous emulsions tend to be unstable both due to their small particle size, and the negatively charged exterior surface of the particles. Without pretreatment of filler material, adhesion of bituminous material, such as asphalt, to the filler surface rapidly takes place and agglomeration of the finely-divided filler results.

Thus, it is another object of the process of this invention to pretreat the filler surface to result in nonadhesion of bituminous material to the filler and thus enable one to obtain a dispersion of finely-divided filler in an aqueous cationic bituminous emulsion system. It is highly desirable to prepare the complete filled composition in a central plant. When such products are packaged and distributed through the channels of commerce to the ultimate users, generally several months elapse prior to use. It is therefore, necessary that the filled cationic bituminous compositions will be storage stable without resulting in agglomeration for periods of many months.

The process of our invention may be applied to a wide variety of finely-divided materials. Practically all mineral fillers including asbestos, slate flour, talc, silica dust, limestone powder, mica and the like are suitable for use. Most organic or vegetable fillers are also within the scope of our invention. For example, materials such as ground cork, rubber crumbles and the like may be used for their insulating or sound proofing properties, and lend themselves to processing by the method of the present invention. Cellulosic fillers, such as wood flour, or organic fillers such as pigments, coal dust, synthetic fillers and the like may be employed. The choice of a particular filler is dependent upon the desired end use of the storage stable dispersion. Two or more different filler materials may be utilized to form the compounds of our invention. By finely-divided fillers we intend to include filler materials which contain particles of a size such that at least about 80 percent will pass an 8 mesh screen. Fillers of a size that will pass an 8 mesh standard mesh are recognized in the art as fine. One particularly suitable size distribution is set forth as ASTM designation D546.

| Sieve size | Percent passing by dry weight |
|---|---|
| 30 | 100 |
| 100 | 90 |
| 200 | 65 |

One large use of the compounds of our invention is as a spray-on asphaltic sound deadening composition. Powdered limestone is particularly suitable as a filler in such applications.

The process of our invention involves a pretreatment procedure wherein a finely-divided filler material, the kind above described, is contacted with an aqueous solution of a treating agent which advantageously alters the surface charge of the filler material. In achieving the described result, it has been found that treating agents from the class of chemicals known as amine oxides are particularly desirable. Use of tertiary amine oxides to pretreat filler materials enables use of finer particle size filler to formulate a storage stable cationic bituminous emulsion composition. Further, it has been found that a greater amount of filler material may be incorporated into the emulsion system than when previous pretreatment methods are utilized.

We have found a wide variety of amine oxides are suitable for use in our invention. Generally, aliphatic amine oxides having at least 1 aliphatic hydrocarbon group having from 6 to 22 carbon atoms are suitable. Amine oxides suitable for the practice of this invention include those of the formulae:

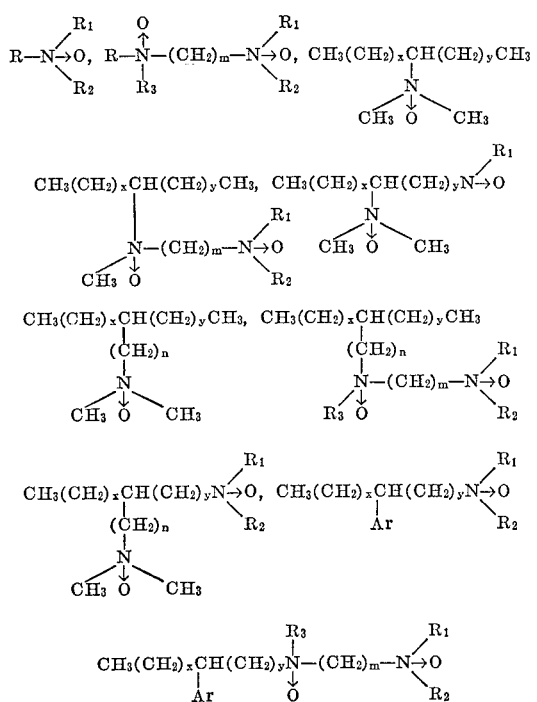

wherein:

R is an aliphatic hydrocarbon radical having from 6 to 22 carbon atoms;

R₁ is selected from the group consisting of aliphatic hydrocarbon radicals having from 1 to 22 carbon atoms,

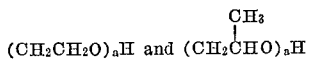

R₂ is selected from alkyl radicals having from 1 to 4 carbon atoms,

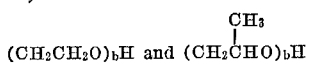

R₃ is selected from alkyl radicals having from 1 to 4 carbon atoms,

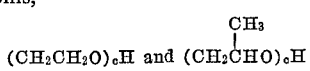

$a$, $b$, and $c$ are positive integers having a sum from about 1 to 25; $m$ is a positive integer from 2 to about 6;

$x$ and $y$ are positive integers having a sum from about 1 to 22;

$n$ is a positive integer from 1 to about 12; and

Ar is an aryl radical selected from a group of phenyl, naphthyl, phenyl substituted with from 1 to 2 groups selected from methyl, hydroxy, methoxy and phenoxy.

The alipihatic radicals may be saturated or unsaturated and straight, branched chain or cyclic.

One preferred sub-class of compounds are dimethyl mono-amine oxides having a normal alkyl or alkenyl chain of from 6 to 22 carbon atoms. Such groups include octyl, nonyl, decyl, undecyl, dodecyl, tetradecyl, pentadecyl, hexadecyl, heptadecyl, octadecyl, nondecyl, eicosyl, heneicosyl, docosyl and mixtures of saturated and unsaturated radicals such as are derived from coco, tallow, soya and like natural sources. Another sub-class of compounds are di(ethoxylated)amine oxides having one of the above described hydrocarbon radicals. Still another preferred sub-class are the corresponding amine dioxides wherein the nitrogen atoms are joined by a trimethylene group. Amine oxides wherein the long chain hydrocarbon radical is a normal alkyl or normal alkenyl group may be prepared according to methods well known in the art.

Another preferred sub-class of compounds are those wherein the long chain hydrocarbon radical is a secondary-alkyl group having from 4 to 25 carbon atoms. Amine oxides of this type may be prepared according to methods disclosed in U.S. Pat. 3,270,060 and copending U.S. patent application Ser. No. 505,034. In the latter disclosure, amine oxides are prepared from secondary-alkyl primary amines prepared from olefins according to the process described in U.S. Pat. 3,338,967. Amine oxides so prepared generally are mixtures of various chain lengths corresponding to the particular olefin cuts utilized. For example, suitable amine oxides may be prepared having the secondary-alkyl of $C_7-C_9$, $C_9-C_{11}$, $C_{11}-C_{14}$, and $C_{15}-C_{20}$.

Still another sub-class of suitable amine oxides are those having an aryl-substituted alkyl group which may be prepared according to methods described in copending U.S. patent application Ser. No. 591,403. Such compounds may be formed from the amines produced by arylation of an unsaturated amine or acid, particularly amine oxides may be formed from compounds such as phenylstearylamine.

All of the amine oxides described in the aforementioned patent and patent applications are suitable for use in our invention.

In order to obtain storage stable dispersions of filler material in cationic bituminous emulsions according to our invention, it is desirable to employ the amine oxide pretreating agent in an amount in the range from about 0.2 to 10 percent by weight, based upon the weight of the filler. It is especially suitable to use from about 0.5 to 4 percent by weight. The concentration of filler in the compositions of our invention may vary over a wide range depending on desired properties. For example, products may contain from about 5 to about 70 percent of filler based upon the total weight of the composition. For application as roofing compositions, tile setting cements, and crack sealers, fillers we prefer to use from about 5 to 20 percent. We have found our invention especially desirable for preparation of sound deadeners wherein it is desired to utilize a high amount of filler, and in such instances, the filler may comprise from 50 to 70 percent of the product.

The amine oxide pretreating agents may be used in conjunction with other pretreating agents such as quaternary ammonium compounds and other compounds such as wetting agents.

The method of preparing dispersions of negatively charged fillers in aqueous bituminous emulsions according to our invention comprises wetting the exterior of the finely-divided filler material with an aqueous solution of the amine oxide. The concentration of the aqueous solution is not particularly critical, enough water should be employed so as to thoroughly wet the exterior surfaces of the filler material. On the other hand, it is undesirable to employ excess water, since the dilution effect of the water is undesirable in the production of a highly filled composition. Customary blending or mixing equipment can be employed, no special equipment being necessary. Following pretreating in the aqueous amine oxide solution, the wetted filler material is mixed with the cationic bituminous emulsion in a suitable amount, primarily dependent upon the desired product and the end use of the product. The cationic bituminous emulsions suitable are those that contain an aqueous phase, a dispersed bituminous phase, and a cationic bituminous emulsifier for the bituminous phase. The dispersed bituminous phase may be asphalt or other similar bitumen or resinous material such as plastic residues from coal, coal tar distillation, petroleum pitch, petroleum resins, coumarone-indene resins, plastic modified petroleum resins and the like. The bitumen will ordinarily be employed in a concentration of from about 20 to 80 percent by weight of the emulsion, while the more usual concentration will range from 50 to 70 percent. Cationic emulsifiers which are effective for forming oil-in-water bituminous emulsions include N-alkyl polymethylene diamines, N-alkyl polymethylene polyethoxylated diamines, amido amines, heterocrylic amines and alkyl and alkylpolyethoxylated quaternary and diquaternary ammonium compounds. Various modifiers and stabilizers well known in the art may also be incorporated in the bituminous emulsion systems.

This invention is further illustrated by the following specific examples. In the following examples all parts are by weight.

EXAMPLE I 1 part of hydrogenated tallow dimethyl amine oxide was dissolved in 14 parts of water. 50 parts of limestone (200 mesh) and 4 parts of asbestos were added to the aqueous amine oxide solution and mixed until all of the filler was uniformly surface wetted. 31 parts of a cationic asphalt emulsion containing 60% 70 pen. vacuum reduced asphalt, 40% water, 0.75% N-tallow, N,N,N',N',N'-pentamethyl trimethylene diquaternary ammonium chloride, and 0.05% hydroxy ethyl cellulose was prepared according to methods well known in the art, blended into the pretreated filler composition and mixed until a homogeneous mixture was obtained. 0.05 part of tributyl phosphate was added to the finished formulation to control entrained air. The above formulation provided a smooth dispersion of filler in the aqueous cationic asphalt emulsion which was storage stable, and could be readily sprayed. The sprayed-on product exhibited excellent properties as a sound deadening composition.

EXAMPLE II

In a manner similar to that of Example I, 12 parts of water and 1 part hydrogenated tallow di(hydroxyethyl) amine oxide were mixed to form a pretreatment solution. 55 parts limestone (200 mesh) were added with 4 parts of asbestos to the aqueous amine oxide solution and mixed until all filler was uniformly surface wetted. 28 parts of the cationic asphalt emulsion described in Example I was blended into the pretreated filler composition and mixed until a homogeneous mixture was obtained. 0.05 parts of tributyl phosphate was added to the finished formulation to control entrained air. The above formulation provided a composition which could be readily sprayed and exhibited excellent properties as a sound deadening composition.

EXAMPLE III

In a manner similar to that of Example I, 10 parts of water, 1 part of hydrogenated tallow dimethylamine oxide, and 2 parts $NH_4NO_3$ were mixed to form a pretreatment solution. The $NH_4NO_3$ serves as a wetting agent, 56.5 parts limestone (200 mesh) were added with 2 parts of asbestos to the aqueous amine oxide solution and mixed until all filler was uniformly surface wetted. 28.5 parts of the cationic asphalt emulsion described in Example I was blended into the pretreated filler composition and mixed until a homogeneous mixture was obtained. The above formulation provided a composition which could be readily sprayed and exhibited excellent properties as a sound deadening composition.

EXAMPLE IV

Using the same components as Example III, the following composition was formulated:

| | Percent |
|---|---|
| Water | 10 |
| Amine oxide | 1 |
| Sodium nitrite | 2 |
| Limestone | 66 |
| Asbestos | 2 |
| Asphalt emulsion | 18.5 |

The above formulation provided a composition which could be readily sprayed and exhibited excellent properties as a sound deadening composition.

EXAMPLE V

Using the same components as in Example III, the following composition was formulated:

| | Percent |
|---|---|
| Water | 10 |
| Amine oxide | 1 |
| Sodium nitrite | 5 |
| Limestone | 60 |
| Asbestos | 4 |
| Asphalt emulsion | 20 |

The above formulation provided a composition which could be readily sprayed and exhibited excellent properties as a sound deadening composition.

EXAMPLE VI

In a manner similar to that of Example I, 10 parts of water and 1 part of dimethyl phenylstearylamine oxide was mixed to form a pretreatment solution. 62 parts limestone (200 mesh) was added with 2 parts of asbestos to the aqueous amine oxide solution and mixed until all filler was uniformly surface wetted. 25 parts of the asphalt emulsion described in Example I was blended with the pretreated filler composition and mixed until a homogeneous mixture was obtained. The above formulation provided a composition which could be readily sprayed and exhibited excellent properties as sound deadening compositions.

EXAMPLE VII

A composition similar to that of Example VI was prepared, the only difference being that dimethyl secondary-alkyl($C_{15}$–$C_{20}$)amine oxide was used as a pretreating agent. The amounts and other ingredients were identical. The formulation could be readily sprayed and was storage stable for long periods of time. The formulation was useful as a sound deadening composition.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:
1. The method of preparing dispersions of negatively charged fillers in aqueous cationic bituminous emulsion, comprising wetting the external negatively charged surfaces of finely-divided filler material, 80 percent of said filler material passing an 8-mesh screen, with an aqueous solution of tertiary mono-amide oxide in an amount of from about 0.2 to 10 percent by weight of said filler, and selected from the group of amine oxides consisting of amine oxides having the formulas:

(1)

(2)
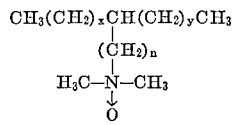

(3)
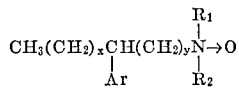

wherein:

R is an aliphatic hydrocarbon radical having from 6 to 22 carbon atoms;

$R_1$ is selected from the group consisting of aliphatic hydrocarbon radicals having from 1 to 22 carbon atoms,

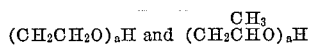

$R_2$ is selected from alkyl radicals having from 1 to 4 carbon atoms,

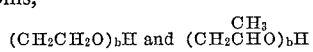

$x$ and $y$ are positive integers having a sum from about 1 to 22;

$n$ is a positive integer from 1 to about 12; and

Ar is an aryl radical selected from a group of phenyl, naphthyl, phenyl substituted with from 1 to 2 groups selected from methyl, hydroxy, methoxy and phenoxy and thereafter mixing from about 5 to about 70 weight percent based upon the total composition of the wetted filler with a cationic bituminous emulsion having a continuous aqueous phase, a dispersed bituminous phase containing from about 20 to 80 weight percent bitumen based upon the emulsion weight, and a cationic emulsifier for the bituminous phase, said mixing being carried out while maintaining said bituminous phase in a dispersed condition, thereby obtaining a dispersion of said filler material in said bituminous emulsion.

2. The dispersions produced by the method of claim 1.

3. The method of claim 1 wherein said amine oxide is represented by the formula

wherein R is an aliphatic hydrocarbon radical having from 6 to 22 carbon atoms; $R_1$ is selected from the group consisting of aliphatic hydrocarbon radicals having from 1 to 22 carbon atoms,

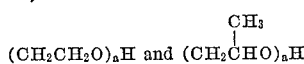

$R_2$ is selected from the alkyl radicals having from 1 to 4 carbon atoms,

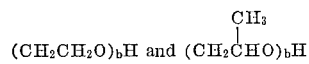

and $a$ and $b$ are integers having a sum of from 1 to about 25.

4. The method of claim 1 wherein said amine oxide is presented by the formula

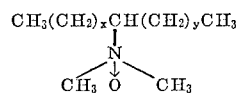

wherein $x$ and $y$ are positive integers having a sum from about 1 to 22.

5. The method of claim 1 wherein said amine oxide is represented by the formula

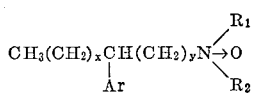

wherein $R_1$ is selected from the group consisting of aliphatic hydrocarbon radicals having from 1 to 22 carbon atoms,

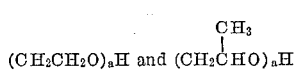

$R_2$ is selected from alkyl radicals having from 1 to 4 carbon atoms,

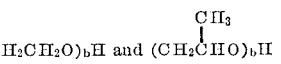

and $a$ and $b$ are integers having a sum of from 1 to about 25; $x$ and $y$ are positive integers having a sum from about 1 to 20; and Ar is an aryl radical selected from a group of phenyl, naphthyl, and phenyl substituted with from 1 to 2 groups selected from methyl, hydroxy, methoxy and phenoxy.

6. The method of claim 1 wherein at least about 90 percent of said filler material will pass a 100 mesh screen.

7. The method of claim 1 wherein said filler is limestone comprising particles of such size that at least 90 percent will pass a 100 mesh screen and said cationic bituminous emulsion is a cationic asphaltic emulsion.

8. The dispersions produced by the method of claim 7.

References Cited

UNITED STATES PATENTS

| 2,760,878 | 8/1956 | Lhorty | 106—277 XR |
| 3,000,750 | 9/1961 | Felletschin et al. | |
| 3,014,810 | 12/1961 | Dybalski et al. | |
| 3,220,953 | 11/1965 | Borgfeldt. | |
| 3,281,368 | 10/1966 | Zimmerer | 260—490 XR |
| 3,309,399 | 3/1967 | Zienty et al. | 252—152 XR |

DONALD J. ARNOLD, Primary Examiner

J. B. EVANS, Assistant Examiner

U.S. Cl. X.R.

106—283; 94—20, 22; 252—311.5